US005302437A

United States Patent [19]

Idei et al.

[11] Patent Number: 5,302,437

[45] Date of Patent: Apr. 12, 1994

[54] INK JET RECORDING SHEET

[75] Inventors: Kouji Idei; Masaru Andoh; Hideaki Senoh; Hirokazu Ohkura, all of Tokyo, Japan

[73] Assignee: Mitsubishi Paper Mills Limited, Tokyo, Japan

[21] Appl. No.: 916,431

[22] Filed: Jul. 21, 1992

[30] Foreign Application Priority Data

| | | | |
|---|---|---|---|
| Jul. 25, 1991 | [JP] | Japan | 3-210007 |
| Dec. 16, 1991 | [JP] | Japan | 3-331926 |
| Jun. 5, 1992 | [JP] | Japan | 4-145123 |

[51] Int. Cl.$^5$ .................... B32B 9/00

[52] U.S. Cl. .................... 428/195; 428/308.4; 428/323; 428/341; 428/454; 428/500; 428/532; 428/688

[58] Field of Search .................... 428/195, 201, 206, 323, 428/402, 914, 913, 308.4, 323, 341, 454, 500, 532, 688; 346/135.1

[56] References Cited

U.S. PATENT DOCUMENTS

| | | | |
|---|---|---|---|
| 4,636,409 | 1/1987 | Arai et al. | 428/206 |
| 5,180,624 | 1/1993 | Kojima et al. | 428/195 |

FOREIGN PATENT DOCUMENTS

| | | |
|---|---|---|
| 4131256 | 3/1992 | Fed. Rep. of Germany . |

*Primary Examiner*—Patrick J. Ryan
*Assistant Examiner*—William A. Krynski
*Attorney, Agent, or Firm*—Armstrong, Westerman, Hattori, McLeland & Naughton

[57] ABSTRACT

Disclosed is a coat type ink jet recording sheet which has on one side of a support a backcoat layer containing a specific platy inorganic pigment and on another side an ink-receiving layer containing at least one of starch particles, modified starch particles and ethylene-vinyl acetate copolymer resins, and a specific cationic dye fixing agent in such an amount as providing a specific cation charge per unit area of the recording sheet. This ink jet recording sheet is less in curling and cockling in wide ranges of temperature and humidity, improved in runnability on recording apparatuses, high in light resistance and ozone resistance of recorded images and in adhesion of the coating layers, less in blotting of overlapped color ink dots of the recorded images and besides, hardly undergoes yellowing.

3 Claims, No Drawings

INK JET RECORDING SHEET

The present invention relates to a recording sheet for recording with inks and, more particularly, to an ink jet recording sheet high in image density of graphics or letters recorded thereon, excellent in absorption of ink and much reduced in occurrence of blotting in overlapped color ink portions. The present invention further relates to an ink jet recording sheet, characterized in that bond of coated layer to base sheet is markedly improved, yellowing of the recording sheet per se is remarkably reduced and besides, curling is highly inhibited in wide ranges of temperature and humidity whereby running property in recording by usual recording apparatuses is much improved and furthermore, images recorded on the surface are prevented from striking through to the back side and thus, record images of high quality can be obtained under wide temperature and humidity conditions.

According to ink jet recording systems, graphics or characters are recorded on a recording sheet by ejecting fine drops of ink by various principles onto a recording sheet such as paper. The ink jet recording systems allow high-speed recording, produce no noise, easily perform multicolor recording, are great in versatility of recording patterns, and do not require developing-fixing processing and have rapidly become popular in various fields of use for recording various figures including kanji and color images. Moreover, images formed by multicolor ink jet recording systems are by no means inferior to those which are formed by printing using printing plates, multicolor printing and color photography. In such use as requiring only small numbers of copies, the ink jet recording systems are less expensive than photographic systems so that they are widely employed in the field of full color image recording.

For recording sheets used in the ink jet recording systems, efforts have been made from the sides of apparatus and composition of ink in order for using woodfree papers or coated papers used for general printing or writing. However, higher characteristics have also been required for recording sheets with improvement in performances of ink jet recording apparatuses such as increase in speed and formation of finer images and full color images and with expansion of uses. That is, for such recording sheets, it is required that density of ink dots printed thereon is high and color tone thereof is clear and vivid, ink is quickly absorbed and do not flow out or blot even when ink dots are overlapped, ink dots do not diffuse in lateral direction more than needed and perimeter of ink dots is smooth and is not blurred.

Ink jet recording sheets can be roughly classified into plain paper type which absorbs ink also into support thereof, such as woodfree papers and bond papers and coated paper type having an ink-receiving layer provided on a support such as papers, for example, woodfree paper, synthetic papers and synthetic resin films.

The coated paper type includes sheets of low coating amount of about 1–10 $g/m^2$, those of medium coating amount of about 10–20 $g/m^2$ and those of high coating amount of about 20 $g/m^2$ or more. Especially, as supports mainly composed of pulp fibers and fillers, there can be considered base papers of 0 to several ten seconds in Stöckigt sizing degree coated in various coating amounts depending on amount of ink to be applied. Especially, in the case of color recording, there are not only monochromatic recording of yellow, magenta, cyan and black each alone, but also recording by overlapping these inks and since the amount of ink applied is large in such case, when coating amount of the ink-receiving layer is small, the coating layer cannot completely absorb the inks. Therefore, it is necessary to use a base paper of relatively low sizing degree to absorb a part of the applied ink in the support.

However, when a base paper of low sizing degree is used, absorption of ink is good, but ink deeply penetrates into the support to cause problems such as strike-through of inks and cockling of the sheet (wrinkles). Further, since the ink-receiving layer is designed so as to absorb an aqueous ink as quickly as possible, it is susceptible to influence of humidity. That is, humidity causes difference in elongation and contraction between the support and the ink-receiving layer to cause curling and thus, there is the problem that runnability of the sheet in recording by usual recording apparatus is damaged.

In order to solve these problems, Japanese Patent Kokai No. Hei 2-270588 discloses an ink jet recording sheet comprising a paper substrate on both sides of which ink-receiving layers are separately provided and Japanese Patent Kokai No. Sho 62-282967 discloses an ink jet recording sheet comprising a substrate on which an ink-retaining layer and an ink-transporting layer and in addition, a curl-inhibiting layer having properties same as or similar to those of ink-retaining layer are provided. Furthermore, Japanese Patent Kokai No. Sho 61-235184 discloses a recording material having an ink-receiving layer which is provided with a curl-inhibiting layer comprising resins such as polyacrylamide. In addition, Japanese Patent Kokai Nos. Sho 62-162586 and 62-162587 disclose improving the sheet carrying property of printer and blocking resistance by providing a layer comprising a slight amount (0.01–1.0 $g/m^2$) of powder on the side of a film substrate opposite to the recording layer side or on both sides.

It is further desired that when the recorded image is wetted with water, the image does not blot and does not stain the recording sheet and decoloration is not brought about. Furthermore, there are needed recording sheets which hardly discolor or fade upon exposure to light, ozone gas, oxidizing gas or the like.

In order to solve these problems, various proposals have been made. For example, Japanese Patent Kokai No. Sho 52-53012 discloses an ink jet recording sheet prepared by wetting a base paper of low sizing degree with a coating composition for surface treatment and Japanese Patent Kokai No. Sho 53-49113 discloses an ink jet recording sheet prepared by impregnating a sheet containing urea-formalin resin powders with a water-soluble polymer. Besides, Japanese Patent Kokai No. Sho 55-5830 discloses an ink jet recording sheet comprising a support on the surface of which is provided an ink absorbing coat and Japanese Patent Kokai Nos. Sho 55-51583 and 56-157 disclose use of non-colloidal silica powders as pigment in coat and Japanese Patent Kokai Nos. Sho 55-11829 discloses a coated paper having two layers differing in ink absorbing speed.

Moreover, Japanese Patent Kokai Nos. Sho 55-51583 and 56-157 disclose use of starch in combination with non-colloidal silica for controlling absorption and spread of ink dots.

There are many examples of using cationic dye fixing agents for improving water resistance as reported, for example, in Japanese Patent Kokai Nos. Sho 60-11389, 62-238783, 64-9776 and 64-77572. Furthermore, there are many proposals for improving light resistance. Besides the above-mentioned proposals, there have been made many proposals to solve various problems from the side of recording sheet in ink jet recording method. Accordingly, quality of recorded images has also been highly improved.

On the other hand, in order to obtain high printed dot density and image density and ensure clarity, colorfulness and transparency attained by making best use of the features of dyes, ideally it is necessary that the ink dye is fixed on the surface of the recording sheet and solvent in the ink is absorbed into the lower coating layer or the support.

In the case of non-coated type ink jet recording sheet, it per se must have absorbability and can be a non-sized paper or a low sized paper which contains a slight amount of a sizing agent or an increased amount of filler. However, when recording is carried out with an aqueous ink, such recording sheet is good in absorbability, but images formed thereon are low in colorfulness and clarity and printed dot density and image density are also low, resulting in deterioration of shape of dot and blur of perimeter of dot called feathering, namely, feather-like indentation. Further problem is that the ink deeply penetrates into the base paper and strikes through to the back side.

On the other hand, in the case of coat type ink jet recording sheet, a recording sheet made by providing a coating layer on a non-sized paper or low sized paper as a support is good in absorbability and is improved in colorfulness and clarity of images, feathering and strike-through of ink dots as compared with non-coat type ink jet recording sheet. Especially, images recorded on a recording sheet having a coating layer comprising non-colloidal silica powder and water-soluble polymer have markedly excellent colorfulness, clarity and resolution and are improved in the problems of feathering and strike-through of ink.

In the case of recording sheet made by providing a coating layer on a support such as highly sized paper, polyethylene terephthalate film, synthetic paper or the like which does not absorb or slightly absorbs solvent of aqueous ink, since the support per se hardly absorbs ink solvent, dye is retained on the surface of recording sheet and images superior in printed dot density, image density, colorfulness and clarity and showing little feathering and strike-through of ink can be easily obtained. However, when coating amount is small, absorbability of ink is inferior and especially, ink absorption speed is low and absorbing capacity is small in the case of recording by overlapping some color inks. If coating amount is increased for the purpose of increasing absorbing capacity, adhesion of the coating layer is apt to deteriorate or dusting may occur. Thus, improvement is needed in these respect.

These coat type ink jet recording sheets can provide good images of high density, excellent colorfulness and clarity and less in feathering and strike-through of ink. It is considered that this is because internal voids of powders such as non-colloidal silica powders are large and amount of ink absorbed into the powders, namely, the coating layer is large and they are fine powders at least 90% of which have a volumetric average particle size of 1–20 μm and which have small refractive index and light scattering coefficient.

As aforementioned, ink jet recording sheets are required to have the following characteristics.

(1) Runnability on normal recording apparatuses is much improved by highly inhibiting occurrence of curls over wide ranges of temperature and humidity.
(2) Recorded image of high quality can be obtained under conditions of wide ranges of temperature and humidity by inhibiting strike-through of the image recorded on the surface and cockling of the sheet.
(3) Recorded dot density and image density are high.
(4) Colorfulness and clarity of the image are superior.
(5) Shape of recorded dot is satisfactory.
(6) The sheets are superior in ink absorbability.
(7) Storage stabilities of recorded images such as water resistance, light resistance and ozone resistance are high.
(8) In the case of coat type recording sheets, adhesion of coating layer is high and falling off of powders is little.
(9) yellowing of recording sheets per se hardly occurs.
(10) Dot diameter of overlapped color ink portion is nearly the same as dot diameter of monochromatic portion and blotting of ink in overlapped color ink portion is much reduced an highly minute recorded image is obtained.

Therefore, the object of the present invention is to provide a coat type ink jet recording sheet which satisfies the above required characteristics and is well-balanced in the characteristics.

That is, the present invention relates to an ink jet recording sheet comprising a support having at least one ink-receiving layer provided on one side by coating or impregnation and at least one backcoat layer provided on another side by coating or impregnation, the backcoat layer containing a platy inorganic pigment having an aspect ratio (ratio of average particle size/thickness) of 5–90 and an average particle size of 0.1–25 μm.

The present invention further relates to the above ink jet recording sheet wherein the ink-receiving layer contains at least one material selected from starch particle, modified starch particle and ethylene-vinyl acetate copolymer resin containing 10–40 mol % of ethylene, and a cationic dye fixing agent in an amount of 0.2–40 meq/m$^2$ in terms of cation charging amount per unit area of the recording sheet.

The present invention further relates to the above ink jet recording sheet wherein said platy inorganic pigment comprises at least one pigment selected from platy kaolin clay, platy basic calcium carbonate, platy sericite, platy zeaklite, platy mica, platy magnesium carbonate and platy talc.

The present invention further relates to the above ink jet recording sheet wherein coating amount of the backcoat layer is 1–10 g/m$^2$ and the ink-receiving layer contains synthetic silica and water-soluble polymeric binder as main components and coating amount of the ink-receiving layer is 1–10 g/m$^2$ and more preferably difference between coating amount of the ink-receiving layer and that of the backcoat layer is 5 g/m$^2$ or less.

When a platy inorganic pigment having an aspect ratio of 5–90 and an average particle size of 0.1–25 μm is used in the backcoat layer, gas permeability of the recording sheet lowers to inhibit penetration of ink deposited on the ink-receiving layer in the direction of Z axis and hence, recorded images or letters are high in density, strike-through of ink is inhibited and cockling is also reduced. Moreover, curling is prevented in the wide ranges of temperature and humidity. Specifically, in the case of the sheet of A4 size, by reducing the height of curl within ±10 mm per 1 sheet under the conditions of temperature of 5°–40° C. and relative humidity of 10–90%, runnability of the sheet in normal recording apparatuses is markedly improved. Even when the aspect ratio is less than 5, curling can be inhibited, but the effect to inhibit strike-through of ink is small.

Starch particles used in the present invention are those which are produced from maize (corn starch), wheat, barley, rice, potato, cassava (tapioca), sweet potato, sago and the like. Modified ones of these starches include, for example, the following modified starch particles comprising starch derivatives.

(1) Oxidizing starches obtained by oxidation of the above starches with oxidizing agents such as sodium hypochlorite.
(2) Acid-treated starches obtained by treatment with hydrochloric acid, sulfuric acid or the like.
(3) Enzyme-treated starches.
(4) Dialdehyde starches reacted with periodic acid.
(5) Esterified starches such as acetylated starch, urea-phosphoric acid-esterified starch and phosphoric acid-esterified starch.
(6) Etherified starches such as hydroxyalkylated starch and carboxyalkylated starch.
(7) Cationized starch.
(8) Crosslinked starches such formaldehyde-crosslinked starch, epichlorohydrin-crosslinked starch and phosphoric acid-crosslinked starch.
(9) Graft-polymerized starches obtained by polymerizing starches having active point with vinyl monomers such as acrylic acid, acrylonitrile, acrylamide, methacrylates and vinyl acetate or cyclic monomers such as epoxides, episulfides, imines and lactams.

Among these starch particles, preferred in the present invention are those which have no or substantially no cold water solubility and desirably have substantially no solubility in water of 40° C. or lower and have a gelatinization starting temperature of 50° C. or higher. Further, temperature of coating solution at preparation and coating is preferably lower than 50° C. When temperature of the coating solution at preparation and coating is higher than the gelatinization temperature, the starch particles cannot maintain their original shape and inner portion of the particles is also gelatinized and hence, the coating solution at preparation and coating is thickened and cannot be coated or even if it can be coated, do not maintain shape of particles on the recording sheet and thus, object of the present invention cannot be attained. In the present invention, there must be present starch particles which maintain particle shape in the recording sheet.

Particle size of the starch particles is not specifically limited, but preferably is in the range of 1–20 μm in volume average particle diameter. When the particle size is too small, void between particles and amount of void decrease to cause reduction in absorbing speed and absorbing capacity. In the case of overlapping color printing, when amount of ink is large, the ink overflows on the surface of the recording sheet and tends to deteriorate the quality of the recorded image. On the other hand, when particle diameter is too large, the surface of the recording sheet becomes too rough and feathering occurs, the shape of recorded dot is deteriorated and quality of recorded image is considerably reduced. Therefore, starch particles having desired particle size obtained by selection of starch, classification treatment and grinding treatment must be selected depending on diameter of ink droplets and recording density. Average particle size of starch particles (not yet subjected to modification, classification and grinding) produced from raw materials is 15 μm on average (about 6–25 μm) for corn starch, 6 μm on the average of smaller particles and 25 μm on the average of large particles (about 2–40 μm) for wheat starch, 5 μm on the average (about 1–10 μm) for rice starch, 40 μm on the average (about 2–100 μm) for potato starch, 20 μm on the average (about 4–35 μm) for tapioca starch, and 30 μm on the average (about 10–65 μm) for sago starch.

Normally, starch particles retain about 12–17% of water in the atmosphere to maintain equilibrium state. Upon absorption of water, the particles swell and upon desorption of water, they contract and thus, their particle size varies. Furthermore, starch particles have fine porous structure and in general, reversibly absorb and desorb about 40–60% of water. Among them, rice starch absorbs 78–80% of water. Some of modified starch particles show the higher absorption of water. Characteristics of these starches are mentioned in "Handbook of Starch Science" supervised by Jiro Nikuni (published on Jul. 20, 1977 from Asakura Shoten).

Ethylene content of ethylene-vinyl acetate copolymer resins used in the present invention is preferably 10–40 mol %, more preferably 10–30 mol %. If ethylene content is less than 10 mol %, sufficient water repellency cannot be obtained and penetration of ink in XY directions of recording sheet is large. Therefore, blotting occurs at the boundary of overlapped color printed portion and images of high quality cannot be obtained. Furthermore, if ethylene content is more than 40 mol %, ink absorbability decreases and especially, ink overflows in the overlapped color portion and images of high quality cannot be obtained.

The ink-receiving layer has the structure having continuous voids, namely, fine pores. The fine pores act as capillaries and in the case of aqueous ink, the dye together with water which is a main solvent penetrate not only in the direction of Z axis which is the direction of thickness of the recording sheet, but also in the directions of XY. Due to this penetration in the directions of XY, mixing of inks occurs at the boundary portion to cause blurring of boundary in overlapped color ink portions. If the dye ununiformly penetrates in the directions of XY, feathering occurs and besides, reduction of image density is brought about. In addition, a phenomenon similar to chromatography occurs in the overlapped color printed portions and the respective dyes separate at the edge of the printed portion, resulting in deterioration of color vividness.

In order to obtain highly minute images on an ink jet recording sheet, it is essential not only to inhibit blurring of boundary by controlling the penetration of ink (dye) in the directions of XY, but also to obtain optimum dot diameter and to form dots having the shape which is as close to right circle as possible.

As the cationic dye fixing agent used in the present invention, there may be used at least one of monomers, oligomers and polymers of primary-tertiary amines or quaternary ammonium salts which dissociate when dissolved in water to show cationic property and preferred are oligomers and polymers. Especially preferred are cationic dye fixing agents of 1–10 meq/g in cation charge measured by colloidal titration. If it is less than 1 meq/g, fixability for water-soluble dye contained in the aqueous ink is inferior and water resistance of recorded image decreases. In this case, the amount of the fixing agent to be applied to the recording sheet must be increased, but application of the fixing agent in a large amount to the recording sheet reduces absorbability to cause overflow of ink and highly minute record images cannot be obtained. If the cation charge is more than 10 meq/g, water resistance of recorded image can be improved by application of the fixing agent in a small amount, but light resistance or ozone resistance of the recorded image are inferior and considerable yellowing of the sheet occurs.

Content of the fixing agent on the surface of the ink jet recording sheet of the present invention is 0.1–5 $g/m^2$, preferably 0.2–3 $g/m^2$, by which the object of the present invention can be attained. Further, fixability for water-soluble dyes is improved with increase in the cation charge per unit area of the ink jet recording sheet. The cation charge per unit area of the ink jet recording sheet is expressed by the following formula and is 0.2–40 $meq/m^2$, preferably 0.7–20 $meq/m^2$.

$$(\text{Cation charge (meq/g)}) \times (\text{Content of the fixing agent } (g/m^2))$$

In the present invention, at least one known white pigment can be used in the ink-receiving layer or the backcoat layer. Examples of the white pigments are white inorganic pigments such as precipitated calcium carbonate, ground calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudoboehmite, aluminum hydroxide, alumina, lithopone, zeolite, hydrated halloysite, magnesium carbonate and magnesium hydroxide and organic pigments such as styrene-based plastic pigments, acrylic plastic pigments, polyethylene, microcapsules, urea resin and melamine resin. Among them, porous inorganic pigments are preferred as white pigments contained in the ink-receiving layer as main component and examples are porous synthetic amorphous silica, porous magnesium carbonate and porous alumina and especially preferred are porous synthetic amorphous silicas having a large pore volume.

In the present invention, the ratio (weight ratio) of total amount of starch particle and white pigment/cationic dye fixing agent is 100/5–100/80, preferably 100/10–100/40.

Furthermore, the ratio (weight ratio) of starch particle/white pigment is preferably 10/90–100/0.

The adhesives used in the present invention include, for example, polyvinyl alcohol, vinyl acetate, oxidized starch, etherified starch, cellulose derivatives such as carboxymethyl cellulose and hydroxyethyl cellulose, casein, gelatin, soybean protein, and silyl-modified polyvinyl alcohol; conjugated diene copolymer latexes such as maleic anhydride resin, styrene-butadiene copolymer and methyl methacrylate-butadiene copolymer; acrylic polymer latexes such as polymers or copolymers of acrylates and methacrylates; vinyl polymer latexes such as ethylene-vinyl acetate copolymer; functional group-modified polymer latexes prepared by modifying the above-mentioned polymers with monomers containing functional groups such as carboxyl group; aqueous adhesives, for example, thermosetting synthetic resins such as melamine resin and urea resin; and synthetic resin adhesives such as polymethyl methacrylate, polyurthane resin, unsaturated polyester resin, vinyl chloride-vinyl acetate copolymer, polyvinyl butyral and alkyd resin. These may be used each alone or in combination of two or more. The ratio (weight ratio) of total amount of starch particle and white pigment/adhesive is preferably 100/10–100/100.

As supports used in the present invention, mention may be made of paper, thermoplastic resin films, synthetic papers, synthetic resin laminate papers such as photographic supports, and sheet-like materials such as nonwoven fabrics mainly composed of wood fibers or synthetic fibers. In the case of paper, internal sizing agents may be or may not be added, sizing agents such as neutral sizing agent, polymer sizing agent and acidic sizing agent may be used each alone or in combination, fillers may be or may not be contained, and size press may be or may not be employed. As the internal fillers for paper supports, known white pigments may be used each alone or in combination and examples are white inorganic pigments such as precipitated calcium carbonate, ground calcium carbonate, kaolin, clay, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic silica, aluminum hydroxide, alumina, lithopone, zeolite, magnesium carbonate and magnesium hydroxide and organic pigments such as styrene-based plastic pigments, acrylic plastic pigments, polyethylene, microcapsules, urea resin and melamine resin.

Furthermore, in the case of the support being paper, it is preferable that the paper contains a neutral sizing agent and a filler, the ratio of wood pulp/filler is 90–70% by weight/10–30% by weight and basis weight if 60–120 $g/m^2$, but there is not limitation.

The ink jet recording sheet of the present invention can be produced, for example, by disintegrating pulp fibers to prepare a slurry, making a sheet from the slurry by a paper machine, if necessary, with addition of fillers or sizing agents and other additives and drying or, after making a sheet, size pressing the sheet with an aqueous solution of starch or polymer, drying and machine calendering it to obtain a support, and thereafter, providing thereon at least one ink-receiving layer using a coating apparatus or size pressing apparatus. Heating temperature of dryer is 100° C. or higher, preferably 120° C. or higher as the maximum heating temperature. Higher temperature is preferred in view of drying efficiency, but the temperature has no special limitation. The machine calender may be or may not be used, but preferably is used considering operability in the subsequent coating step. Either on-machine coater or off-machine coater may be used for providing the ink-receiving layer. For example, there may be used conventionally known air-knife coater, curtain coater, die coater, blade coater, gate roll coater, bar coater, rod coater, roll coater, bill blade coater, and short dwell blade coater. Thereafter, the coated paper is finished by calenders such as machine calender, super calender and soft calender.

In the present invention, as other additives there may be optionally added pigment dispersants, thickeners, flowability improvers, defoamers, foam-inhibitors, releasing agents, foaming agents, penetrants, color dyes, color pigments, fluorescent brighteners, ultraviolet absorbers, antioxidants, preservatives, antifungal agents, water resisting agents, wet strength agents and dry strength agents.

The aqueous ink in the present invention is a recording solution comprising the following colorant, solvent and other additives.

As the colorants, mention may be made of water-soluble dyes such as direct dyes, acidic dyes, basic dyes, reactive dyes and food dyes.

As solvents for the aqueous ink, mention may be made of water and water-soluble organic solvents, for example, alkyl alcohols of 1–4 carbon atoms such as methyl alcohol, ethyl alcohol, n-propyl alcohol, isopropyl alcohol, n-butyl alcohol, sec-butyl alcohol, tert-butyl alcohol and isobutyl alcohol; amides such as dimethylformamide and dimethylacetamide; ketones or ketone alcohols such as acetone and diacetone alcohol; ethers such as tetrahydrofuran and dioxane; polyalkylene glycols such as polyethylene glycol and polypropylene glycol; alkylene glycols having alkylene group of 2–6 carbon atoms such as ethylene glycol, propylene glycol, butylene glycol, triethylene glycol, 1,2,6-hexanetriol, thiodiglycol, hexylene glycol and diethylene glycol; and lower alkyl ethers of polyhydric alcohols such as glycerin, ethylene glycol methyl ether, diethylene glycol methyl (or ethyl) ether and triethylene glycol monomethyl ether. Among these water-soluble organic solvents, preferred are polyhydric alcohols such as diethylene glycol and lower alkyl ethers of polyhydric alcohols such as triethylene glycol monomethyl ether and triethylene glycol monoethyl ether. As other additives, mention may be made of, for example, pH adjustors, sequestering agents, antifungal agents, viscosity modifiers, surface tension adjustors, wetting agents, surface active agents and rust proofing agents.

The recording sheet of the present invention is used not only as ink jet recording sheet, but also as any recording sheets which use inks which are liquid at the time of recording. Examples of such recording sheets are image receiving sheets for heat transfer recording which comprises heating, from back side, an ink sheet prepared by coating a heat-melting ink mainly composed of heat-melting substance and dye or pigment on a thin support such as a resin film, a high density paper or a synthetic paper, thereby to melt the ink and transferring the ink, ink jet recording sheets on which recording is carried out by ejecting thereon fine droplets of a heat-melting ink which is molten by heating, ink jet recording sheets on which recording is carried out with an ink prepared by dissolving an oil-soluble dye in a solvent, and image receiving sheets used with photosensitive and pressure-sensitive type donor sheets which use microcapsules containing a photopolymerizable monomer and a colorless or colored dye or pigment.

Common point in these recording sheets is that the ink is in liquid state at the time of recording. The liquid ink penetrates or diffuses in the depth direction and the horizontal direction of ink-receiving layer before curing, solidification or fixation. The above-mentioned various recording sheets need the absorbability depending on the recording methods and the recording sheet of the present invention can be utilized as above-mentioned various recording sheets.

Furthermore, the ink jet recording sheet of the present invention may be used as the electrophotographic recording sheet on which toner is fixed by heating and which is widely used in copying machines and printers.

In the ink jet recording sheet of the present invention, occurrence of curl under environmental conditions in wide ranges of from low temperature and low humidity to high temperature and high humidity can be considerably inhibited by providing a backcoat layer containing a platy inorganic pigment having a high aspect ratio. Mechanism of the inhibition of curling is not clear, but it is presumed that planes of plates of individual platy inorganic pigment particles partially overlap with each other in the backcoat layer to increase the probability of planes of plate of the inorganic pigment particles being oriented densely and in parallel to the surface of the support sheet and as a result, the backcoat layer strongly adheres to the support and the sheet is hardly influenced by humidity. It is further presumed that cockling also hardly occurs for the same reasons. Furthermore, for the same reasons, the backcoat layer functions as a barrier layer and can markedly inhibit the strike-through of overlapped color record image in case the support per se has absorbability.

The ink jet recording sheet of the present invention can be prevented from yellowing in white paper thereof after storage with maintaining absorbability and colorfulness. Mechanism of yellowing is not clear, but it is considered that oxidizing gases or antioxidants is adsorbed by catalytic action of porous inorganic pigments to cause yellowing of dye fixing agent per se or the adsorbed antioxidant. The ink jet recording sheet of the present invention which contains no porous inorganic pigments in the ink-receiving layer hardly yellows and shows markedly excellent storage stability.

On the other hand, although it has been known that ink jet recording sheets provided with an ink-receiving layer containing porous inorganic pigments such as synthetic amorphous silica and cationic dye fixing agents, especially synthetic amorphous silica as the porous inorganic pigment have high cumulative pore volume and are excellent in absorbability and low in refractive index due to their large specific surface area and internal void and thus they show good colorfulness, they have the defect of strong yellowing after storing of white papers due to combination of porous inorganic pigments and cationic dye fixing agents.

In the present invention, although mechanism is not clear, yellowing is highly inhibited by containing starch particles or modified starch particles and ethylene-vinyl acetate copolymer resin or cationic dye fixing agents in combination.

Furthermore, in the ink jet recording sheet of the present invention, diameter of overlapped color ink dot and that of monochromatic ink dot are nearly the same and blotting of the second color ink is quite a little. The mechanism of diameter of overlapped color ink dot becoming larger than that of monochromatic ink dot is not clear, but in the conventional ink jet recording sheets containing porous inorganic pigments, for example, for recording of blue, when magenta is recorded immediately after recording of cyan, blue can be expressed, but magenta ink dot blots around blue ink dot in the form of a concentric circle, resulting in a larger dot diameter than in the case of monochromatic recording. As a result, hue of the recorded image changes and color reproducibility and resolution are deteriorated to cause reduction in sharpness of image and deterioration in quality of recorded image. However, in the ink jet recording sheet of the present invention, there occurs substantially no blotting of the second ink in the overlapped color portion. This advantageous effect can also be exhibited to some extent in the ink jet recording sheet of the present invention which contains each alone the starch particles or the modified starch particles and the ethylene-vinyl acetate copolymer resin or the cationic dye fixing agent, but the effect is synergistically enhanced by containing them in combination.

The present invention will be illustrated by the following nonlimiting examples. In these examples, "part" and "%" are both by weight unless otherwise notified.

Ink jet recording characteristics were measured by the following methods.

(1) Printed image density

This was determined by measuring the optical density of solid images printed with each of black, yellow, magenta and cyan using an ink jet printer IO-720 manufactured by Sharp Corporation. The higher value shows the higher density. For example, for the black, a value of 1.30 or higher means sufficiently good result.

(2) Diameter of printed dot

Dots were printed with each of cyan ink and magenta ink and with cyan ink+magenta ink by overlapping these inks using the ink jet printer IO-720. Diameter of the dot as a circle (Heywood diameter) was calculated by the following formula (I) using an image analyzing apparatus.

$$HD=\{(4/\pi)\times A\}^{\frac{1}{2}} \quad (I)$$

In the above formula, HD means heywood diameter and A means the measured area.

(3) Degree of blotting of overlapped color ink portion

Degree of blotting of overlapped color ink portion was evaluated by the ratio of the diameter of the dot printed with a cyan ink and a magenta ink by overlapping these inks to the diameter of the dot printed with single magenta ink. The smaller value shows that the difference in diameter between the single ink dot and the overlapped color ink dot is small and quality of the image is superior. The ratio of 1-1.2 time means good quality and when the ratio exceeds the above value, the image appears inferior in quality.

(4) Yellowing of white paper

A square of 5 cm×5 cm was cut out from the center portion of one side of a commercially available polypropylene plastic bag (A4 size) and the recording sheet was put in the bag so that the coated layer of the recording sheet faced the cut out square portion. This bag was subjected to the treatment of leaving for 1 month in a room and then the sample recording sheet was taken out therefrom and L*a*b* (color specification method in accordance with CIE) of the thus treated recording sheet was measured. Degree of yellowing can be expressed by the difference in b* before and after the treatment. The smaller value means less yellowing.

(5) Adhesion

A commercially available adhesive tape was applied to the surface of the coated layer and adhesion was evaluated by the degree of powders which sticked to the tape.

(6) Water resistance

An ink jet recording sheet on which solid images were printed with each of black ink, yellow ink, magenta ink and cyan ink by the printer IO-720 was dipped in running water for 5 minutes and was dried. Thereafter, densities of the image before and after the treatment were compared and retention of the optical density was measured. The higher value means the better water resistance and no change is indicated by 100%. If it exceeds 100%, when the ink jet recording sheet is dipped in water, ink flows out into water and again dyes the sheet or the ink blots on the sheet in planar direction. In any way, the closer to 100%, the better.

(7) Light resistance

An ink jet recording sheet on which solid images were printed with each of black ink, yellow ink, magenta ink and cyan ink by the printer IO-720 as exposed to light for 20 hours by a xenon fadeometer and light resistance was shown by retention of optical density after the exposure to light. The higher value means higher retention and higher resistance.

(8) Ozone resistance

An ink jet recording sheet on which solid images were printed with each of black in, yellow ink, magenta ink and cyan ink by the printer IO-720 was exposed to air stream containing 200 ppm of ozone for 20 minutes and ozone resistance was shown by retention of optical density after the exposure to ozone. The higher value means higher retention and higher resistance.

The optical density was measured by RD-918 manufactured by Macbeth Co.

(9) Ink absorbing speed

A solid red image was printed on an ink jet recording sheet with a magenta ink and a yellow ink by overlapping these inks by the printer IO-720 and immediately thereafter (after about 1 second), the sheet was delivered and allowed to contact with a paper press roll or fingers. The ink absorbing speed was evaluated by whether the roll or fingers were stained or not. No stain means high and good ink absorbing speed.

(10) Curl

An ink jet recording sheet was left to stand for more than 24 hours in an environment of 5° C.·10% RH, 20° C.·65% RH, or 40° C.·90% RH and thereafter, height of curls which occurred at the four corners of the recording sheet of A4 size (210 mm×297 mm) was measured. When the four corners curled up with the ink-receiving layer facing upward, this is indicated by [+] and when they curled to the opposite side, this is indicated by [−] and the height was expressed by mm. "±0 mm" is the best and in the case of being within ±10 mm, the state is satisfactory even by visual observation and running property of the recording sheet in a printer provided with an automatic paper feeding apparatus is good. When it is outside ±10 mm, the appearance is inferior even by visual observation and running property of the sheet in a printer provided with an automatic paper feeding apparatus is inferior and the sheet cannot be fed or obliquely runs and is practically unacceptable.

(11) Cockling and staining of recorded image owing to contacting with head

A solid blue image was printed on an ink jet recording sheet with a cyan ink and a magenta ink by overlapping these inks by an ink jet printer IO-720. State of wrinkles was evaluated by visual observation and besides, staining caused by contacting of the printing head with protrudent portions of wrinkles was evaluated.

(12) Strike-through

A solid blue image was printed on an ink jet recording sheet with a cyan ink and a magenta ink by overlapping these inks by an ink jet printer IO-720 and optical density of magenta was measured from the back side of the recorded image. When the optical density is less than 0.25, there is no problem in practical use and when it is more than 0.25, the ink clearly strikes through the sheet to the back side and this causes problems in practical use.

COMPARATIVE EXAMPLE 1

On the surface of a woodfree paper having a basis weight of 80 $g/m^2$, a pulp/filler ratio of 80%/20% and a Stöckigt sizing degree of 10 seconds and containing 0.06% of an alkyl ketene dimer as a base paper was coated a coating solution (15% in concentration) comprising 100 parts of a synthetic amorphous silica (Fineseal X-37B manufactured by Tokuyama Soda Co., Ltd.), 600 parts of polyvinyl alcohol of 10% in solid concentration (PVA 117 manufactured by Kuraray Co., Ltd.) and 67 parts of a cationic dye fixing agent of 30% in solid concentration (Sumirase Resin 1001 manufactured by Sumitomo Chemical Co., Ltd.) at a coating amount of 6 $g/m^2$ by an air knife coater to form an ink-receiving layer. The resulting coated sheet was subjected to supercalendering to obtain an ink jet recording sheet.

COMPARATIVE EXAMPLE 2

On the back side of the coated sheet of Comparative Example 1 was coated polyvinyl alcohol of 10% in solid concentration (PVA 117) at a coating amount of 5 $g/m^2$ by an air knife coater to form a backcoat layer. The resulting coated sheet was subjected to supercalendering to obtain an ink jet recording sheet.

COMPARATIVE EXAMPLE 3

On the back side of the coated sheet of Comparative Example 1 was coated the same coating solution as coated on the surface side at a coating amount of 5 $g/m^2$ by an air knife coater to form a backcoat layer. The resulting coated sheet was subjected to supercalendering to obtain an ink jet recording sheet. The synthetic amorphous silica (Fineseal X-37B) had an aspect ratio of less than 5.

COMPARATIVE EXAMPLE 4

On the back side of the coated sheet of Comparative Example 1 was coated a coating solution of 20% in solid concentration comprising 100 parts by weight of ground calcium carbonate (Softon 2200 manufactured by Shiraishi Calcium Co.) and 200 parts of polyvinyl alcohol of 20% in solid concentration (PVA 117) at a coating amount or 5 $g/m^2$ by an air knife coater to form a backcoat layer. The sheet was subjected to supercalendering to obtain an ink jet recording sheet. The ground calcium carbonate (Softon 2200) had an aspect ratio of less than 5.

EXAMPLE 1

On the back side of the coated sheet of Comparative Example 1 was coated a coating solution of 20% in concentration comprising 100 parts of delaminated kaolin clay (Nuclay manufactured by Engelhard Industries; aspect ratio: 5–50; particle size: 2–20 μm) and 200 parts of polyvinyl alcohol of 10% in solid concentration (PVA 117) at a coating amount of 5 $g/m^2$ by an air knife coater to form a backcoat layer. This sheet was subjected to supercalendering to obtain an ink jet recording sheet.

EXAMPLE 2

An ink jet recording sheet was prepared in the same manner as in Example 1 except that 100 parts of platy basic calcium carbonate (BCC-07 manufactured by Chichibu Sekkai Kogyo Co.; aspect ratio: about 10; average particle size: 0.7 μm) was used as the pigment in the backcoat layer.

EXAMPLE 3

An ink jet recording sheet was prepared in the same manner as in Example 1 except that 100 parts of platy zeaklite (Zeaklite TMC manufactured by Zeaklite Co.; aspect ratio: 5–90; average particle size: 2–3 μm) was used as the pigment in the backcoat layer.

EXAMPLE 4

An ink jet recording sheet was prepared in the same manner as in Example 1 except that 100 parts of platy synthetic mica (MK-100 manufactured by Cope Chemical Co.; aspect ratio: 20–30; average particle size: 2.7 μm) was used as the pigment in the backcoat layer.

EXAMPLE 5

An ink jet recording sheet was prepared in the same manner as in Example 1 except that 100 parts of platy magnesium carbonate (aspect ratio: about 10; average particle size: 23 μm) was used as the pigment in the backcoat layer.

EXAMPLE 6

An ink jet recording sheet was prepared in the same manner as in Example 1 except that 100 parts of platy sericite (aspect ratio: 5–90; average particle size 2–3 μm) was used as the pigment in the backcoat layer.

EXAMPLE 7

An ink jet recording sheet was prepared in the same manner as in Example 1 except that 100 parts of platy talc (aspect ratio: about 10; average particle size: 5–6 μm) was used as the pigment in the backcoat layer.

EXAMPLE 8

An ink jet recording sheet was prepared in the same manner as in Example 1 except that coating amount of the backcoat layer was 10 $g/m^2$.

EXAMPLE 9

An ink jet recording sheet was prepared in the same manner as in Example 1 except that coating amount of the backcoat layer was 2 $g/m^2$.

EXAMPLE 10

An ink jet recording sheet was prepared in the same manner as in Example 1 except that 70 parts of platy delaminated kaolin clay (Nuclay manufactured by Engelhard Industries; aspect ratio: 5–50; average particle size: 2–20 μm) and 30 parts of hydrated Halloysite (tradename, mfd. by Shishu Kaolin; aspect ratio: less than 5; average particle size: 5 μm) were used as the pigments in the backcoat layer.

EXAMPLE 11

An ink jet recording sheet was prepared in the same manner as in Example 1 except that 60 parts of platy delaminated kaolin clay (Nuclay; aspect ratio: 5–50; average particle size: 2–20 μm) and 40 parts of ground calcium carbonate (Softon 2200, mfd. by Shiraishi Calcium Co.) were used as the pigments in the backcoat layer.

Composition and coating amount of the backcoat layer are shown in Table 1 and results of measurement of the above characteristics are shown in Table 2.

TABLE 1

| | Blending ratio of backcoat layer Pigment (part)/PVA (part) | Coating amount ($g/m^2$) |
|---|---|---|
| Comparative Example 1 | — | — |
| Comparative Example 2 | 0/100 | 5 |
| Comparative Example 3 | [Same as in the ink-receiving layer in Comparative Example 1] | 5 |
| Comparative Example 4 | Ground calcium carbonate 100/20 | 5 |
| Example 1 | Platy delaminated kaolin 100/20 | 5 |
| Example 2 | Platy basic calcium carbonate 100/20 | 5 |
| Example 3 | Platy zeaklite 100/20 | 5 |
| Example 4 | Platy synthetic mica 100/20 | 5 |
| Example 5 | Platy magnesium carbonate 100/20 | 5 |
| Example 6 | Platy sericite 100/20 | 5 |
| Example 7 | Platy talc 100/20 | 5 |
| Example 8 | Platy delaminated kaolin 100/20 | 10 |
| Example 9 | Platy delaminated kaolin 100/20 | 2 |
| Example 10 | Playt delaminated kaolin 70/ hydrolated halloysite 30/20 | 5 |
| Example 11 | Platy delamintaed kaolin 60/ ground calcium carbonate 40/20 | 5 |

COMPARATIVE EXAMPLE 5

0.8 Part of cation starch, 10 parts of ground calcium carbonate, 15 parts of precipitated calcium carbonate and 0.10 part of an alkyl ketene dimer neutral sizing agent were added to a pulp slurry comprising 67 parts of LBKP having a freeness of 450 ml CSF and 8 parts of NBKP having a freeness of 480 ml CSF and pH of the pulp slurry was adjusted to 8.2. Then, the pulp slurry was made into a sheet by a Fourdrinier paper machine and dried and successively the resulting sheet was impregnated with an aqueous solution of oxidized starch by a size press at 5 $g/m^2$ (solid content) on both sides, dried and finished by machine calender to obtain a coated base paper of 95 $g/m^2$ in basis weight. The Stöckight sizing degree was 20 seconds.

On the side of this coated base paper on which much filler was distributed was coated a coating solution (15% in concentration) comprising 100 parts of a synthetic amorphous silica (Fineseal X-37B) as a porous inorganic pigment and 400 parts of polyvinyl alcohol of 15% in solid concentration (PVA 117) as a binder at a coating amount of 8 $g/m^2$ (solid content) by an air knife coater and was dried at a maximum temperature of hot air of 120° C. or higher. Furthermore, on another side of this coated paper was coated a coating solution (30% in concentration) comprising 50 parts of a platy delaminated kaolin clay (Nuclay manufactured by Engelhard Industries; aspect ratio: 5–50; particle size 2–20 μm), 50 parts of hydrated halloysite (Shinshu Kaolin; aspect ratio: less than 5; average particle size: 5 μm), 50 parts of a silane-modified polyvinyl alcohol of 10% in solid concentration (R Polymer 1130 manufactured by Kuraray Co., Ltd.) and 21 parts of a styrene-butadiene latex of 48% in solid concentration at a coating amount of 8 $g/m^2$ (solid content) by an air knife coter and this backcoat layer was dried. This sheet was further subjected to supercalendering to obtain an ink jet recording sheet.

TABLE 2

| | Height of curl [mm] | | | Strike-through optical | Cockling | | Solid printed image |
|---|---|---|---|---|---|---|---|
| | 5° C. 10% RH | 20° C. 65% RH | 40° C. 90% RH | density (magenta) | Wrinkle*1 | Stain*2 | Optical density (black) |
| Comparative | | | | | | | |
| Example 1 | +50 | +8 | ±0 | 0.34 | D | D | 1.27 |
| Example 2 | −20 | −15 | −3 | 0.33 | D | D | 1.29 |
| Example 3 | −5 | −6 | −2 | 0.29 | C | D | 1.29 |
| Example 4 | +20 | −4 | −1 | 0.26 | C | D | 1.29 |
| Example 1 | +2 | −3 | −1 | 0.18 | B | A | 1.32 |
| Example 2 | +4 | −4 | −2 | 0.17 | B | A | 1.32 |
| Example 3 | +8 | −4 | −2 | 0.17 | B | A | 1.33 |
| Example 4 | +7 | −6 | ±0 | 0.19 | B | A | 1.31 |
| Example 5 | +5 | −5 | −2 | 0.19 | B | A | 1.31 |
| Example 6 | +8 | −4 | −1 | 0.17 | B | A | 1.33 |
| Example 7 | +4 | −2 | +1 | 0.17 | B | A | 1.33 |
| Example 8 | +8 | −4 | −1 | 0.16 | A | A | 1.34 |
| Example 9 | +6 | +2 | +2 | 0.20 | B | A | 1.32 |
| Example 10 | +5 | −3 | −1 | 0.17 | B | A | 1.33 |
| Example 11 | +8 | −4 | −2 | 0.17 | B | A | 1.33 |

*1
A: The recording sheet has substantially no wrinkles and shows superior characteristics.
B: The recording sheet has a few wrinkles, but has no problems in practical use.
C: The recording sheet has wrinkles and has problems in practical use.
D: The recording sheet has many wrinkles and shows inferior characteristics.
*2
A: There occurs no stain of the sheet due to contacting with head owing to cockling.
D: There occurs stain of the sheet due to contacting with head and there are problems in practical use.

As can be seen from the results of Examples 1–11 and Comparative Examples 1–4, by providing a backcoat layer containing a platy inorganic pigment, curling value under various environments is within ±10 mm and especially, there occur less curls under the conditions of low temperature and low humidity and running property of the ink jet recording sheet is highly improved and besides, striking-through of ink can be inhibited and furthermore, wrinkles are few due to inhibition of cockling and there occurs no stain of the sheet due to contacting with head and all-round running property of the ink jet recording sheet can be markedly improved. In this case, there is also obtained the secondary effect that density of the image recorded on the sheet increases.

COMPARATIVE EXAMPLE 6

On the side of the coated base paper used in Comparative Example 5 on which much filler was distributed was coated a coating solution (15% in concentration) comprising 100 parts of undissolved rice starch powder (Micropearl manufactured by Shimada Chemical Industry Co.; average particle size: 4.9 μm) and 400 parts of an aqueous polyvinyl alcohol solution of 10% in solid concentration (PVA 117) as a binder at a coating amount of 8 $g/m^2$ (solid content) by an air knife coater and was dried at a maximum temperature of hot air of 120° C. or higher. Furthermore, a backcoat layer was provided on another side in the same manner as in Comparative Example 5 and the sheet was subjected to supercalendering to obtain an ink jet recording sheet.

COMPARATIVE EXAMPLE 7

On the side of the coated base paper used in Comparative Example 5 on which much filler was distributed was coated a coating solution (15% in concentration) comprising 100 parts of a synthetic amorphous silica (Fineseal X-37B) as a porous inorganic pigment, 400 parts of an aqueous polyvinyl alcohol solution of 10% in solid concentration (PVA 117) as a binder and 100 parts of a cationic dye fixing agent of 30% in solid concentration (Sumirase Resin 1001; cation charge: 3.5 meq/g) at a coating amount of 8 $g/m^2$ (solid content) by an air knife coater and was dried at a maximum temperature of hot air of 120° C. or higher. Furthermore, a backcoat layer was provided on another side in the same manner as in Comparative Example 5 and the sheet was subjected to sueprcalendering to obtain an ink jet recording sheet.

COMPARATIVE EXAMPLE 8

On the side of the coated base paper used in Comparative Example 5 on which much filler was distributed was coated a coating solution (15% in concentration) comprising 100 parts of a synthetic amorphous silica (Fineseal X-37B) as a porous inorganic pigment, 400 parts of polyvinyl alcohol of 10% in solid concentration (PVA 117) and 20 parts of ethylene-vinyl acetate copolymer resin aqueous emulsion a (ethylene content: 10 mol %; Tg: 15° C.; solid concentration: 50%) as a binder at a coating amount of 8 $g/m^2$ (solid content) by an air knife coater and was dried at a maximum temperature of hot air of 120° C. or higher. Furthermore, a backcoat layer was provided on another side in the same manner as in Comparative Example 5 and the sheet was subjected to supercalendering to obtain an ink jet recording sheet.

EXAMPLES 12–16

Ink jet recording sheets were obtained in the same manner as in Comparative Example 7 except that 10 parts, 25 parts, 50 parts or 100 parts of the synthetic amorphous silica was replaced with undissolved rice starch powder (average particle size: 4.9 μm).

EXAMPLE 17

An ink jet recording sheet was obtained in the same manner as in Comparative Example 7 except that 20 parts of an ethylene-vinyl acetate copolymer resin aqueous emulsion a (ethylene content: 10 mol %; Tg: 15° C.; solid concentration: 50%) was added to the coating solution.

EXAMPLE 18

An ink jet recording sheet was obtained in the same manner as in Example 13 except that 20 parts of an ethylene-vinyl acetate copolymer resin aqueous emulsion a (ethylene content: 10 mol %; Tg: 15° C.; solid concentration: 50%) was added to the coating solution.

EXAMPLE 19

An ink jet recording sheet was obtained in the same manner as in Example 16 except that 20 parts (solid content) in the 100 parts of the rice starch powder was replaced with an ethylene-vinyl acetate copolymer resin aqueous emulsion a (ethylene content: 10 mol %; Tg: 15° C.; solid concentration: 50%).

EXAMPLE 20

An ink jet recording sheet was obtained in the same manner as in Exmaple 18 except that 20 parts of the ethylene-vinyl acetate copolymer resin aqueous emulsion a (ethylene content: 10 mol %; Tg: 15° C.; solid concentration: 50%) was replaced with 20 parts of an ethylene-vinyl acetate copolymer resin aqueous emulsion b (ethylene content: 25 mol %; Tg: 5° C.; solid concentration: 50%).

EXAMPLE 21

An ink jet recording sheet was obtained in the same manner as in Example 18 except that 20 parts of the ethylene-vinyl acetate copolymer resin aqueous emulsion a (ethylene content: 10 mol %; Tg: 15° C.; solid concentration: 50%) was replaced with 20 parts of an ethylene-vinyl acetate copolmer resin aqueous emulsion c (ethylene content: 40 mol %; Tg: 0° C.; solid concentration: 50%).

COMPARATIVE EXAMPLE 9

An ink jet recording sheet was obtained in the same manner as in Example 17 except that 20 parts of the ethylene-vinyl acetate copolymer resin aqueous emulsion a (ethylene content: 10 mol %; Tg: 15° C.; solid concentration: 50%) was replaced with 33 parts of a vinyl acetate polymer resin aqueous emulsion (Tg: 29° C.; solid concentration: 30%).

Compositions of the ink-receiving layer in the examples of the present invention and the comparative examples are shown in Table 3, coating amount of the cationic dye fixing agent and cation charge amount per unit area of the ink jet recording sheet are shown in Table 4 and results of measurement in the examples and the comparative exmaples are shown in Tables 5, 6 and 7. The backcoat layers in Examples 12–21 and Comaprative Examples 5–9 were the same.

TABLE 3

| | Compositoin of ink-receiving layer | | | | |
|---|---|---|---|---|---|
| | Rice starch *3 | Ethylene-vinyl acetate copolymers a, b, c and vinyl acetate *4 | Silica *5 | Cationic dye fixing agent *6 | Adhesive PVA *7 |
| Comparative | | | | | |
| Example 5 | — | — | 100 | — | 40 |
| Example 6 | 100 | — | — | — | 40 |
| Example 7 | — | — | 100 | 30 | 40 |
| Example 8 | — | a 10 | 90 | — | 40 |
| Example 9 | — | Vinyl acetate 10 | 100 | 30 | 40 |
| Example 12 | 10 | — | 90 | 30 | 40 |
| Example 13 | 25 | — | 75 | 30 | 40 |
| Example 14 | 50 | — | 50 | 30 | 40 |
| Example 15 | 75 | — | 25 | 30 | 40 |
| Example 16 | 100 | — | — | 30 | 40 |
| Example 17 | — | a 10 | 100 | 30 | 40 |
| Example 18 | 25 | a 10 | 75 | 30 | 40 |
| Example 19 | 80 | a 20 | — | 30 | 40 |
| Example 20 | 25 | b 10 | 75 | 30 | 40 |

TABLE 3-continued

| | Compositoin of ink-receiving layer | | | | |
|---|---|---|---|---|---|
| | Rice starch *3 | Ethylene-vinyl acetate copolymers a, b, c and vinyl acetate *4 | Silica *5 | Cationic dye fixing agent *6 | Adhesive PVA *7 |
| Example 21 | 25 | c 10 | 75 | 30 | 40 |

*3 Rice starch particle (powder) having an average particle size of 4.9 μm.
*4 The ethylene-vinyl acetate copolymer resin of the present invention and vinyl acetate of comparative examples.
Ethylene content
0 mol %: Vinyl acetate
10 mol %: Ethylene-vinyl acetate copolymer resin a
25 mol %: Ethylene-vinyl acetate copolymer resin b
40 mol %: Ethylene-vinyl acetate copolymer resin c
*5 Synthetic amorphous silica (porous).
*6 Cationic dye fixing agent.
*7 Completely saponified polyvinyl alcohol having a polymerization degree of 1700.

TABLE 4

| | | Cationic dye fixing agent | | |
|---|---|---|---|---|
| | Coating amount of ink-receiving layer ($g/m^2$) | Coating amount of fixing agent ($g/m^2$) | Cation charge ($meq./m^2$)*8 | Coating amount of backcoat layer ($g/m^2$) |
| Comparative | | | | |
| Example 5 | 8 | 0 | 0 | 8 |
| Example 6 | 8 | 0 | 0 | 8 |
| Example 7 | 8 | 1.41 | 4.94 | 8 |
| Example 8 | 8 | 0 | 0 | 8 |
| Example 9 | 8 | 1.33 | 4.67 | 8 |
| Example 12 | 8 | 1.41 | 4.94 | 8 |
| Example 13 | 8 | 1.41 | 4.94 | 8 |
| Example 14 | 8 | 1.41 | 4.94 | 8 |
| Example 15 | 8 | 1.41 | 4.94 | 8 |
| Example 16 | 8 | 1.41 | 4.94 | 8 |
| Example 17 | 8 | 1.33 | 4.67 | 8 |
| Example 18 | 8 | 1.33 | 4.67 | 8 |
| Example 19 | 8 | 1.41 | 4.94 | 8 |
| Example 20 | 8 | 1.33 | 4.67 | 8 |
| Example 21 | 8 | 1.33 | 4.67 | 8 |

*8
[Cation charge of the cationic dye fixing agent measured by colloidal titration] - (a)
[Content of the cationic dye fixing agent in the coating layer] - (b)
[Cation charge of the fixing agent per unit area of the ink jet recording sheet] - (c)
[Cation charge (c) of *8 ($meq/m^2$)] = (a) (meq/g) × (b) ($g/m^2$)

TABLE 5

| | Height of curl [mm] 5° C., 10% RH | Strike-through optical density (magenta) | Cockling | | Solid printed image Optical density (black) |
|---|---|---|---|---|---|
| | | | Wrinkle*1 | Stain*2 | |
| Comparative | | | | | |
| Example 5 | −2 | 0.16 | B | A | 1.35 |
| Example 6 | +4 | 0.18 | B | A | 1.30 |
| Example 7 | +3 | 0.16 | B | A | 1.34 |
| Example 8 | ±0 | 0.16 | B | A | 1.34 |
| Example 9 | ±0 | 0.16 | B | A | 1.33 |
| Example 12 | +3 | 0.16 | B | A | 1.34 |
| Example 13 | +4 | 0.16 | B | A | 1.33 |
| Example 14 | +4 | 0.16 | B | A | 1.32 |
| Example 15 | +4 | 0.16 | B | A | 1.31 |
| Example 16 | +2 | 0.18 | B | A | 1.31 |
| Example 17 | ±0 | 0.16 | B | A | 1.33 |
| Example 18 | ±0 | 0.16 | B | A | 1.32 |
| Example 19 | +3 | 0.18 | B | A | 1.31 |
| Example 20 | ±0 | 0.16 | B | A | 1.32 |
| Example 21 | ±0 | 0.16 | B | A | 1.32 |

TABLE 6

| | Diameter of printed dot (μm) | | | Degree of blotting of overlapped color dot | Yellowing of white paper of recording sheet | *9 Adhesion |
|---|---|---|---|---|---|---|
| | Single color dot | | Overlapped color dot | Overlapped color dot/ Single color dot M | | (Peeling of adhesive |
| | C | M | C + M | (time) | Δb | tape) |
| Comparative | | | | | | |
| Example 5 | 320 | 336 | 547 | 1.63 | 3.4 | D |
| Example 6 | 295 | 303 | 412 | 1.36 | 1.1 | A |
| Example 7 | 278 | 267 | 401 | 1.50 | 38.4 | D |
| Example 8 | 285 | 293 | 419 | 1.43 | 2.7 | B |
| Example 9 | 225 | 221 | 343 | 1.55 | 3.2 | C |
| Example 12 | 275 | 260 | 298 | 1.15 | 15.5 | B |
| Example 13 | 282 | 270 | 285 | 1.05 | 14.3 | B |
| Example 14 | 285 | 277 | 292 | 1.03 | 8.7 | A |
| Example 15 | 287 | 280 | 291 | 1.04 | 6.3 | A |
| Example 16 | 286 | 279 | 287 | 1.03 | 4.2 | A |
| Example 17 | 275 | 264 | 304 | 1.15 | 15.3 | B |
| Example 18 | 278 | 275 | 283 | 1.03 | 14.0 | B |
| Example 19 | 283 | 276 | 284 | 1.03 | 1.0 | A |
| Example 20 | 283 | 275 | 283 | 1.03 | 13.9 | B |
| Example 21 | 286 | 280 | 288 | 1.03 | 13.8 | B |

*9
A means that substantially no powders adhere to the adhesive tape and strength of coating layer is high.
B means that a few powders adhere to the adhesive tape, but this causes no problem in practical use.
C means that powders adhere to the adhesive tape and this causes problem under some conditions of use.
D means that a considerable amount of powders adhere to the adhesive tape and this causes problem in practical use/
E means that a large amount of powders adhere to the adhesive tape and the recording sheet cannot be used.

TABLE 7

| | Storage stability of recorded image (Retention of optical density %) | | | | | | | | | | | |
|---|---|---|---|---|---|---|---|---|---|---|---|---|
| | Water resistance | | | | Light resistance | | | | Ozone resistance | | | |
| | Bk | Y | M | C | Bk | Y | M | C | Bk | Y | M | C |
| Comparative | | | | | | | | | | | | |
| Example 5 | 26 | 15 | 8 | 16 | 45 | 58 | 35 | 65 | 38 | 65 | 36 | 45 |
| Example 6 | 15 | 12 | 6 | 15 | 62 | 61 | 46 | 73 | 45 | 86 | 45 | 82 |
| Example 7 | 103 | 101 | 107 | 100 | 62 | 73 | 54 | 74 | 55 | 75 | 54 | 57 |
| Example 8 | 11 | 10 | 6 | 15 | 68 | 67 | 53 | 75 | 82 | 93 | 92 | 93 |
| Example 9 | 103 | 101 | 105 | 100 | 80 | 88 | 78 | 92 | 92 | 93 | 95 | 98 |
| Example 12 | 104 | 100 | 105 | 99 | 77 | 93 | 78 | 93 | 87 | 95 | 92 | 95 |
| Example 13 | 105 | 100 | 106 | 98 | 85 | 96 | 82 | 97 | 93 | 98 | 98 | 99 |
| Example 14 | 104 | 101 | 104 | 99 | 90 | 96 | 85 | 97 | 94 | 98 | 98 | 99 |
| Example 15 | 103 | 101 | 105 | 98 | 93 | 96 | 90 | 98 | 96 | 98 | 98 | 99 |
| Example 16 | 103 | 101 | 104 | 98 | 94 | 97 | 91 | 98 | 98 | 98 | 98 | 99 |
| Example 17 | 103 | 100 | 103 | 99 | 84 | 90 | 81 | 85 | 92 | 94 | 98 | 95 |
| Example 18 | 105 | 99 | 104 | 99 | 91 | 93 | 85 | 97 | 95 | 98 | 98 | 99 |
| Example 19 | 103 | 100 | 103 | 98 | 94 | 95 | 88 | 96 | 98 | 99 | 98 | 99 |
| Example 20 | 105 | 101 | 105 | 98 | 90 | 91 | 85 | 97 | 95 | 98 | 98 | 99 |
| Example 21 | 105 | 101 | 105 | 99 | 89 | 92 | 84 | 97 | 95 | 98 | 98 | 99 |

As can be seen from the results of Examples 12–21 and Comparative Examples 5–9, by providing a back-coat layer containing a platy inorganic pigment, not only over-all runnability of the ink jet recording sheet is superior, but also the ink jet recording sheet having an ink-jet recording layer containing at least one of starch particles or modified starch particles or ethylene-vinyl acetate copolymer resin and besides a cationic dye fixing agent having a specific cation colloid charge is markedly improved in blotting of overlapped color portion and can give highly minute recorded letters of overlapped color. Furthermore, in the case of the ink jet recording sheet having an ink-receiving layer containing a synthetic amorphous silica and a cationic dye fixing agent in combination, yellowing of the ink jet recording sheet can be highly inhibited and besides, adhesion and strength of coating layer are markedly improved when the ink-receiving layer contains starch particles or modified starch particles or ethylene-vinyl acetate copolymer resin.

EXAMPLE 22

10 Parts of ground calcium carbonate, 8 parts of precipitated calcium carbonate and 10 parts of talc as fillers and 0.10 part of an alkyl ketene dimer neutral sizing agent, 0.8 part of cation starch and 0.4 part of sulfuric acid alumina as sizing agents were added to a pulp slurry comprising 65 parts of LBKP having a freeness of 450 ml CSF and 7 parts of NBKP having a freeness of 480 ml CSF and pH of the pulp slurry was adjusted to 8.2. Then, the pulp slurry was made into a sheet by a Fourdrinier paper machine and dried and successively the resulting sheet was impregnated with an aqueous solution of oxidized starch by a size press at 5 $g/m^2$ (solid content) on both sides, dried and finished by machine calender to obtain a coated base paper of 95 $g/m^2$ in basis weight. The Stöckigt sizing degree was 18 seconds.

On the side of this coated base paper on which much fillers were distributed was provided an ink-receiving layer in the same manner as in Example 18 except that the coating amount was 1 $g/m^2$ (solid content) and on the another side was provided a backcoat layer in the same manner was in Comparative Example 5 except that the backcoat solution of Comparative Example 5 was coated at a coating amount of 5 $g/m^2$ (solid content) to obtain an ink jet recording sheet.

EXAMPLE 23

An ink jet recording sheet was obtained in the same manner as in Example 22 except that the coating amount of the ink-receiving layer was 10 $g/m^2$ (solid content).

COMPARATIVE EXAMPLE 10

An ink jet recording sheet was obtained in the same manner as in Example 22 except that the coating amount of the ink-receiving layer was 15 $g/m^2$ (solid content).

EXAMPLE 24

On the side of the coated base paper of Example 22 having less filler was coated a coating solution (30% in concentration) comprising 10 parts of rice starch (average particle size: 4.9 μm), 10 parts of wheat starch (particle size: 2-40 μm), 10 parts of polyvinyl alcohol (PVA 117) and 15 parts of a cationic dye fixing agent (Polyfix 601 manufactured by Showa Kobunshi Co.; cation charge: 6.9 meq/g) at a coating amount of 10 $g/m^2$ (solid content) by an air knife coater and was dried at a maximum temperature of hot air of 120° C. or higher. Furthermore, on the another side of this coated paper was provided the same backcoat layer as in Example 22 and the sheet was supercalendered to obtain an ink jet recording sheet.

EXAMPLE 25

An ink jet recording sheet was obtained in the same manner as in Example 24 except that 30 parts of the cationic dye fixing agent (Polyfix 601) was used in stead of 15 parts.

Coating amount of the cationic dye fixing agent and cation charge per unit area of the ink jet recording sheet in the examples of the present invention and the comparative examples are shown in Table 8 and results of measurement are shown in Tables 9 and 10.

TABLE 8

| | Coating amount of ink-receiving layer ($g/m^2$) | Cationic dye fixing agent: Coating amount of fixing agent ($g/m^2$) | Cationic dye fixing agent: Cation charge (meq./$m^2$) | Coating amount of backcoat layer ($g/m^2$) |
|---|---|---|---|---|
| Comparative Example 10 | 15 | 2.49 | 8.76 | 5 |
| Example 22 | 2 | 0.33 | 1.17 | 5 |
| Example 23 | 10 | 1.66 | 5.84 | 5 |
| Example 24 | 10 | 2.50 | 17.25 | 5 |
| Example 25 | 10 | 5.00 | 34.54 | 5 |

TABLE 9

| | Height of curl [mm] 5° C., 10% RH | Strike-through optical density (magenta) | Cockling: Wrinkle*1 | Cockling: Stain*2 | Solid printed image Optical density (black) |
|---|---|---|---|---|---|
| Comparative Example 10 | +20 | 0.14 | B | A | 1.28 |
| Example 22 | −5 | 0.18 | B | A | 1.30 |
| Example 23 | +3 | 0.15 | B | A | 1.34 |
| Example 24 | −6 | 0.15 | B | A | 1.31 |
| Example 25 | −3 | 0.15 | B | A | 1.32 |

TABLE 10

| | Diameter of printed dot (μm): Single color dot C | Diameter of printed dot (μm): Single color dot M | Diameter of printed dot (μm): Overlapped color dot C + M | Degree of blotting of overlapped color dot: Overlapped color dot/Single color dot M (time) | Yellowing of white paper of recording sheet Δb | *9 Adhesion (Peeling of adhesive tape) |
|---|---|---|---|---|---|---|
| Comparative Example 10 | 253 | 250 | 258 | 1.03 | 5.8 | B |
| Example 22 | 298 | 291 | 329 | 1.13 | 0.7 | A |
| Example 23 | 268 | 265 | 278 | 1.05 | 3.2 | A |
| Example 24 | 270 | 262 | 270 | 1.03 | 1.0 | A |
| Example 25 | 265 | 260 | 268 | 1.03 | 1.2 | A |

As can be seen from Examples 22-25 and Comparative Example 10, advantageous effect can be obtained when coating amounts of the ink-receiving layer and the backcoat layer and difference in these amounts are within specific ranges. Furthermore, when colloid charge of the cationic dye fixing agent per unit area of the ink jet recording sheet is within a specific range, blotting of overlapped color ink portion is quite a little.

As explained above, by providing a backcoat layer containing a platy inorganic pigment having an aspect ratio of 5-90 and an average particle size of 0.1-25 μm on the side of the ink jet recording sheet which is opposite to the ink-receiving layer side, images or letters of high density can be formed on the ink jet recording sheet and further, curling and cockling can be inhibited under the conditions of temperature and humidity in wide ranges and thus, runnability of the ink jet recording sheet in recording by a recording apparatus can be highly improved Furthermore, staining of the recording sheet caused by contact with a head which occurs owing to cockling can also be prevented and clear recorded images with no stain can be obtained. Moreover, striking-through of the images hardly occurs.

Furthermore, when the ink-receiving contains at least one of starch particles or modified starch particles and ethylene-vinyl acetate copolymer resin and besides a cationic dye fixing agent having a specific cation charge per unit area of the ink jet recording sheet, the recorded images or letters have high density, the sheet has high ink absorbability and blotting in the overlapped color ink portion can be greatly reduced and thus, an ink jet recording sheet having well-balanced characteristics which have never been obtained by the conventional techniques can be obtained.

What is claimed is:

1. An ink jet recording sheet which comprises a support, at least one ink-receiving layer having continuous voids provided on one side of the support by coating or impregnation and at least one backcoat layer provided on another side of the support by coating or impregnation, wherein the ink-receiving layer contains synthetic silica and water-soluble polymer binder and coating amount of the ink-receiving layer is 1–10 $g/m^2$; the backcoat layer contains a platy inorganic pigment having an aspect ratio of 5–90 and an average particle size of 0.1–25 $\mu m$, and coating amount of the backcoat layer is 1–10 $g/m^2$; difference in the coating amount of the ink-receiving layer and the coating amount of the backcoat layer is 5 $g/m^2$ or less.

2. An ink jet recording sheet according to claim 1, wherein the ink-receiving layer contains at least one material selected from starch particles and ethylene-vinyl acetate copolymer resins having an ethylene content of 10–40 mol %, and a cationic dye fixing agent in an amount of 0.2–40 $meq/m^2$ in terms of cation charge per unit area of the recording sheet.

3. An ink jet recording sheet according to claim 1, wherein the platy inorganic pigment is at least one pigment selected from platy kaolin clay, platy basic calcium carbonate, platy sericite, platy zeaklite, platy mica, platy magnesium carbonate and platy talc.

* * * * *